United States Patent
Chiu et al.

(10) Patent No.: US 8,988,379 B2
(45) Date of Patent: Mar. 24, 2015

(54) DISPLAY METHOD, ELECTRONIC DEVICE, AND NON-TRANSITORY STORAGE MEDIUM

(71) Applicant: HTC Corporation, Taoyuan County (TW)

(72) Inventors: Kai-Feng Chiu, Taoyuan County (TW); Yu-Jhang Lu, Taoyuan County (TW); Shih-Yun Yang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 18 days.

(21) Appl. No.: 13/951,447

(22) Filed: Jul. 25, 2013

(65) Prior Publication Data

US 2014/0253476 A1 Sep. 11, 2014

(30) Foreign Application Priority Data

Mar. 8, 2013 (CN) .......................... 2013 1 0074710

(51) Int. Cl.
*G06F 3/041* (2006.01)
(52) U.S. Cl.
CPC .................................. *G06F 3/0416* (2013.01)
USPC ........................... 345/173; 345/176; 345/629
(58) Field of Classification Search
None
See application file for complete search history.

(56) References Cited

U.S. PATENT DOCUMENTS

| 2005/0273700 | A1* | 12/2005 | Champion et al. ............ 715/512 |
| 2012/0069050 | A1* | 3/2012 | Park et al. ...................... 345/632 |
| 2012/0098639 | A1 | 4/2012 | Ijas |
| 2012/0293438 | A1 | 11/2012 | Chaudhri et al. |
| 2012/0320085 | A1* | 12/2012 | Mei et al. ...................... 345/629 |
| 2014/0024415 | A1* | 1/2014 | Mikami et al. ................ 455/566 |

FOREIGN PATENT DOCUMENTS

| CN | 101697181 | 4/2010 |
| CN | 102609207 | 7/2012 |

OTHER PUBLICATIONS

"Office Action of Taiwan Counterpart Application", issued on Dec. 27, 2014, pp. 1-12.

\* cited by examiner

*Primary Examiner* — Muhammad N Edun
(74) *Attorney, Agent, or Firm* — Jianq Chyun IP Office

(57) ABSTRACT

A display method, an electronic device, and a non-transitory storage medium are provided. The display method includes following steps. A picture having a first transparency is displayed on a touch screen of the electronic device. A touch operation on the touch screen is detected. A second transparency of the picture is determined according to a position of the touch operation, where the second transparency is higher than the first transparency. The picture having the second transparency and a screen image covered by the picture are simultaneously displayed on the touch screen.

20 Claims, 11 Drawing Sheets

DISPLAY METHOD, ELECTRONIC DEVICE, AND NON-TRANSITORY STORAGE MEDIUM

CROSS-REFERENCE TO RELATED APPLICATION

This application claims the priority benefit of China application serial no. 201310074710.4, filed Mar. 8, 2013. The entirety of the above-mentioned patent application is hereby incorporated by reference herein and made a part of this specification.

BACKGROUND OF THE INVENTION

1. Field of the Invention

The present invention generally relates to a screen image display mechanism, and more particularly, to a display method, an electronic device, and a non-transitory storage medium.

2. Description of Related Art

Generally, an electronic device may enter a screen locking mode after idling for some time or under the control of a user. In this screen locking mode, if the electronic device receives a notification message, the user has to unlock the electronic device in order to view related information. For example, when the electronic device is in the screen locking mode and receives a short message, the user has to unlock the electronic device and then start a short message service (SMS) application program in order to view the short message and related content in its display interface.

However, as described above, every time when the electronic device in the screen locking mode receives a new message, the user has to unlock the electronic device to view the content of the message, which is too inconvenient to the user if the user simply wants to quickly browse the received message.

SUMMARY OF THE INVENTION

Accordingly, the present invention is directed to a display method, an electronic device, and a non-transitory storage medium, in which viewing other screen images when the electronic device is in a screen locking mode and an unlocking mode is made very convenient.

The present invention provides a display method adapted to an electronic device. The electronic device has a touch screen. The display method includes following steps. A picture having a first transparency is displayed on the touch screen. A touch operation on the touch screen is detected. A second transparency of the picture is determined according to a position of the touch operation. The second transparency is higher than the first transparency. The picture having the second transparency and a screen image covered by the picture are simultaneously displayed on the touch screen.

The present invention also provides an electronic device. The electronic device includes a touch screen, a memory, at least one processor, and at least one program. The at least one program is stored in the memory and is configured to be executed by the at least one processor. The at least one program includes instructions for performing following operations. A picture having a first transparency is displayed on the touch screen. A touch operation on the touch screen is detected. A second transparency of the picture is determined according to a position of the touch operation. The second transparency is higher than the first transparency. The picture having the second transparency and a screen image covered by the picture are simultaneously displayed on the touch screen.

The present invention further provides a non-transitory storage medium storing at least one program instruction. The at least one program instruction executes following steps after it is loaded into an electronic device having a touch screen. A picture having a first transparency is displayed on the touch screen. A touch operation on the touch screen is detected. A second transparency of the picture is determined according to a position of the touch operation. The second transparency is higher than the first transparency. The picture having the second transparency and a screen image covered by the picture are simultaneously displayed on the touch screen.

As described above, in the present invention, when an electronic device is in a screen locking mode or an unlocking mode, a picture having a first transparency is displayed on a touch screen, and a touch operation on the touch screen is detected. After that, a second transparency of the picture is determined according to a position of the touch operation, wherein the second transparency is higher than the first transparency. Next, the picture having the second transparency is displayed on the touch screen, and a screen image covered by the picture is also displayed on the touch screen. Thereby, a user can preview the screen image corresponding to a selected image without switching the screen image completely to the screen image corresponding to the selected image, so that operating the electronic device is made very convenient.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
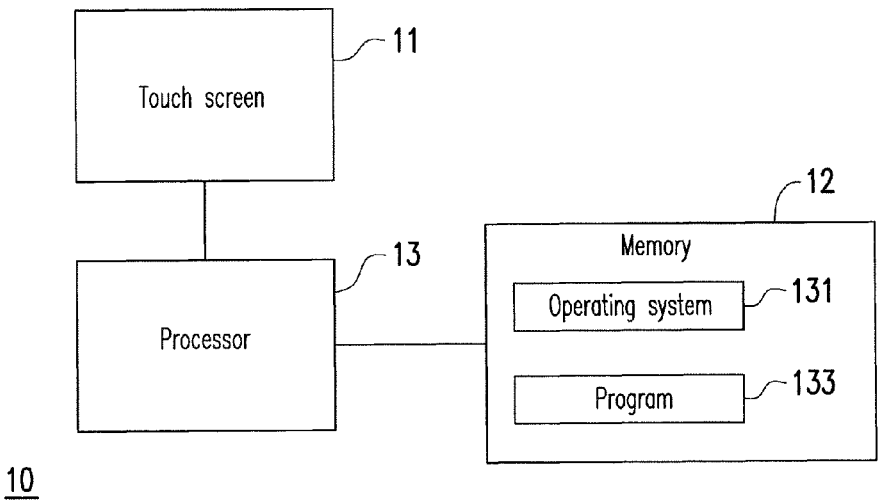
FIG. 1 is a diagram of an electronic device according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

First Embodiment

FIG. 1 is a diagram of an electronic device according to the first embodiment of the present invention. Referring to FIG. 1, the electronic device 10 is an electronic device offering a touch display function, such as a smart phone, a personal digital assistant (PDA), or a tablet PC.

The electronic device 10 includes a touch screen 11, a memory 12, and a processor 13. The touch screen 11 is the input/output interface of the electronic device 10 and is used for displaying various operation screen images of the electronic device 10. In particular, the touch screen 11 can detect different touch operations of a user. For example, these touch operations include clicking operations and dragging operations. In some cases, the touch screen 11 is a resistive touch panel, a capacitive touch panel, an optical touch panel, an acoustic wave touch panel, or an electromagnetic touch panel. However, the type of the touch screen 11 is not limited herein.

The memory 12 is used for storing data and at least one instruction. Substantially, the memory 12 may be built in the electronic device 10 or externally connected to the electronic device 10 through a specific interface. Additionally, the memory 12 may also be a hard disc, a CD-ROM, or an external storage device (for example, a memory card or a flash drive). In some cases, the memory 12 stores at least an operating system (OS) 131 and at least one program 133. The OS 131 includes various software components and/or driving programs for managing general operations of the electronic device 10. For example, the OS 131 provides a user interface such that a user can interact with the electronic device 10 and manage application programs run on the electronic device 10 and files stored in the electronic device 10. The program 133 includes at least one instruction executed by the processor 13. To be specific, the processor 13 runs the program 133 to execute the display method in the present embodiment. Details of the display method will be described later on with reference to accompanying drawings.

The processor 13 is coupled to the touch screen 11 and the memory 12. The processor 13 generates a corresponding operation instruction according to a touch operation detected on the touch screen 11 and controls the touch screen 11 to display a corresponding screen image. For example, in some cases, the processor 13 includes a touch screen controller or a position controller of the touch screen 11. When a user performs a touch operation on the touch screen 11 (for example, touches the touch screen 11), the processor 13 obtains related position information according to a position message generated by the touch screen 11 and stores the related position information into the memory 12. In some cases, the related position information includes the coordinates of the touch operation on the touch screen 11 and the occurrence time of the touch operation. In addition, the processor 13 may be a micro-processor, an embedded processor, or a central processing unit (CPU). However, the implementation of the processor 13 is not limited in the present invention.

Figure 2A:
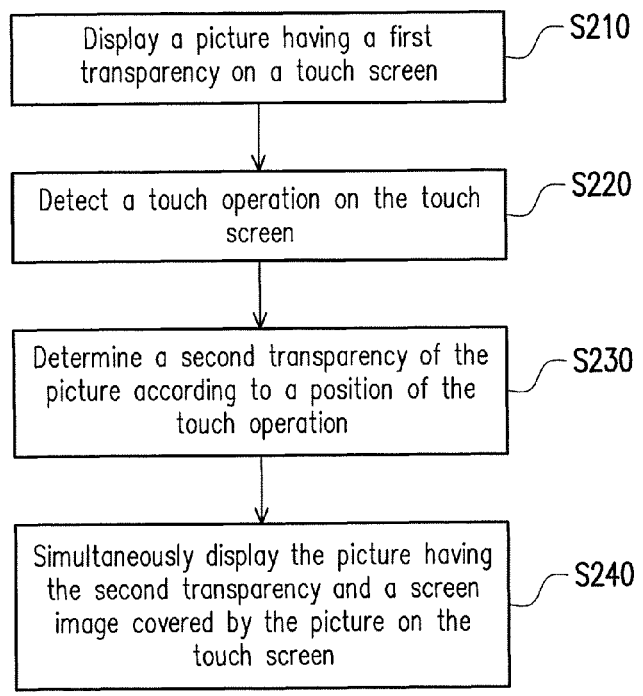
FIG. 2A is a flowchart of a display method according to the first embodiment of the present invention.

FIG. 2A is a flowchart of a display method according to the first embodiment of the present invention. Below, the display method in the present embodiment will be explained with reference to the electronic device 10 and FIG. 2A. Referring to FIG. 2A, in step S210, the processor 13 displays a picture having a first transparency on the touch screen 11. The higher transparency the picture has, the more transparent the picture is, and contrarily, the lower transparency the picture has, the less transparent the picture is. The transparency of a picture can be expressed as a percentage between 0% and 100%. When the transparency is 0%, the picture is opaque, and when the transparency is 100%, the picture is completely transparent. In some cases, the first transparency is the lowest transparency (for example, 0%) of the picture. However, the lowest transparency of a picture can be adjusted (for example, to 5%) according to the actual requirement.

In some cases, the covering range of a picture may be equal to the maximum display area of the touch screen 11. Namely, the entire display area of the touch screen 11 is used for displaying the picture. In some other cases, the covering range of a picture may cover only part of the display area of the touch screen 11. Namely, part of the display area of the touch screen 11 is used for displaying the picture, while the other part of the display area of the touch screen 11 is used for displaying other information (for example, a status column). However, how the display area of the touch screen 11 is used is determined according to the actual requirement.

In step S220, the processor 13 detects a touch operation on the touch screen 11. For example, the processor 13 can detect a clicking or dragging operation of a user on the touch screen 11 and obtain touch information, such as position and displacement, of this touch operation. In some cases, when the processor 13 detects a touch operation on the touch screen 11, the processor 13 directly adjusts the transparency of the picture to a predetermined starting transparency. The predetermined starting transparency (for example, 10%) is greater than the first transparency (for example, 0%).

In step S230, the processor 13 determines a second transparency of the picture according to the position of the touch operation. Herein the second transparency of the picture is higher than the first transparency of the picture. The second transparency may have a positive correlation with the displacement of the touch operation. For example, when the touch operation is a dragging operation, a higher second transparency will be determined with a longer distance between the start position and the end position of the dragging operation, and contrarily, a lower second transparency will be determined with a shorter distance between the start position and the end position of the dragging operation.

In some examples of step S230, the processor 13 calculates the second transparency of the picture according to the displacement of the touch operation (for example, through an algorithm). Additionally, in an embodiment, if the displacement of the touch operation is within a predetermined range, the processor 13 sets the second transparency as a predetermined transparency corresponding to the predetermined range. In other words, by pre-linking a plurality of predetermined ranges and a plurality of predetermined transparencies (for example, by recording the linkages in a lookup table), a predetermined transparency corresponding to a predetermined range can be obtained according to the displacement of the touch operation and set as the second transparency of the picture. Or, in another embodiment, the processor 13 divides the touch screen 11 into a plurality of predetermined areas and records a predetermined transparency corresponding to each predetermined area. When the position of the touch operation is within a predetermined area of the touch screen 11, the processor 13 sets the second transparency of the picture as a predetermined transparency corresponding to the predetermined area.

Thereafter, in step S240, the processor 13 displays the picture having the second transparency on the touch screen 11. Similar to that in step S210, the covering range of the picture may be equal to the maximum display area of the touch screen 11 cover only part of the display area of the touch screen 11. However, the covering range of the picture is determined according to the actual requirement.

In step S250, the processor 13 displays a screen image covered by the picture on the touch screen 11. The screen image may be one of a key frame, a short message service (SMS) screen image, an e-mail screen image, a notebook screen image, a calendar or memo screen image, and a graphic screen image.

Figure 2B:
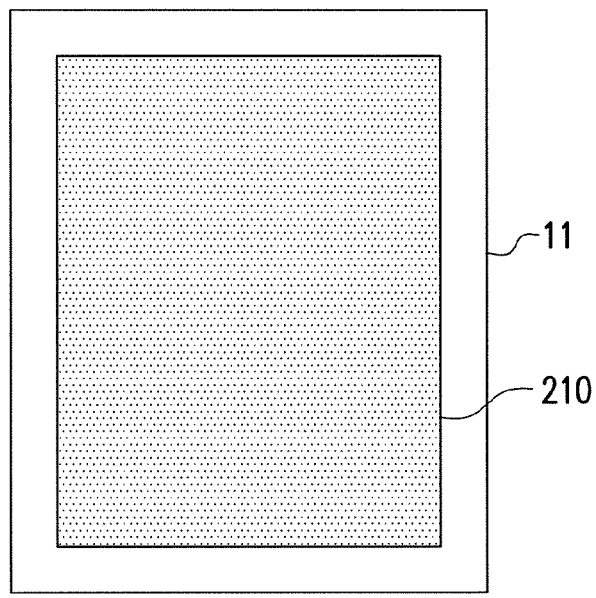
FIG. 2B, FIG. 2C, and FIG. 2D are diagrams illustrating how the transparency of a picture is adjusted according to the first embodiment of the present invention.
Figure 2C:
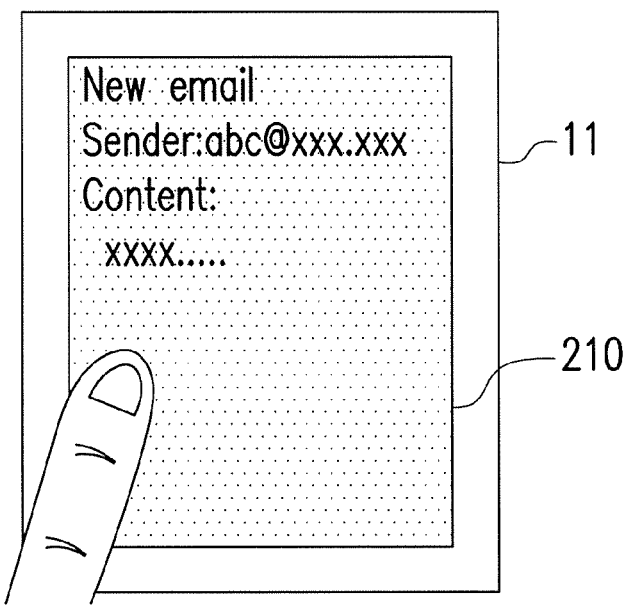
Figure 2D:
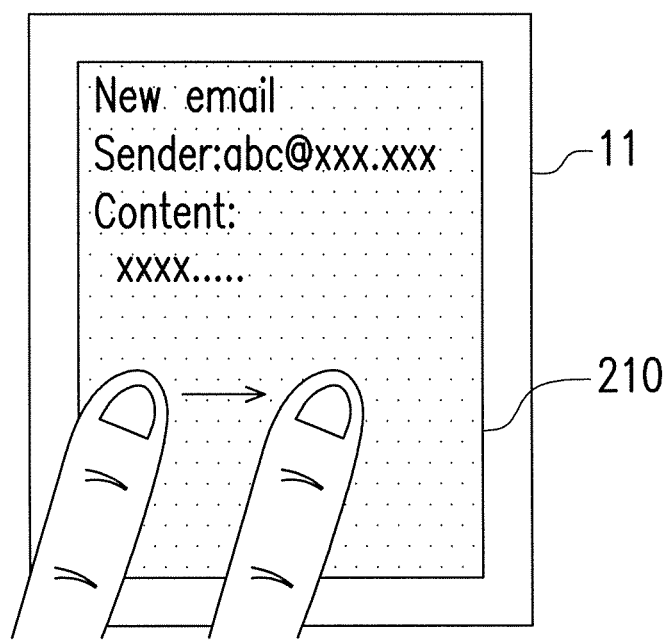

FIG. 2B, FIG. 2C, and FIG. 2D are diagrams illustrating how the transparency of a picture is adjusted according to the first embodiment of the present invention.

In FIG. 2B, assuming that a picture 210 on the touch screen 11 has a first transparency (for example, 0%) at the beginning. As shown in FIG. 2C, when a user touches the touch screen 11 (for example, any position on the picture 210), the transparency of the picture 210 is set to a predetermined starting transparency (for example, 10%) to notify the user that the touch screen 11 is touched, so that the user can view the screen image (for example, an e-mail screen image) covered by the picture 210 conveniently. In some cases, the transparency of the picture 210 in FIG. 2C can remain at the first transparency. Next, as shown in FIG. 2D, when the user slides his or her finger for a distance on the touch screen 11, the transparency (i.e., the second transparency) of the picture 210 is further increased (for example, to 90%). Even though it is assumed that the user's finger slides rightwards in FIG. 2D, the starting point and direction of the sliding operation are not limited in the present invention. In some cases, the second transparency can be determined according to the distance that the user's finger slides on the touch screen 11. For example, the longer the user's finger slides, the higher the second transparency will be.

Particularly, in some cases, when the sliding operation of the user on the touch screen 11 satisfies a predetermined condition (for example, the user's finger slides for a distance longer than a predetermined distance, slides for a time longer than a predetermined time, or slides to a specific area), when the user's finger leaves the touch screen 11, the processor 13 removes the picture 210 and executes a predetermined function (for example, switches the electronic device 10 from a screen locking mode to an unlocking mode).

In some cases, when the processor 13 detects a touch operation on the touch screen 11 in step S220, the processor 13 updates the screen image in response to the touch operation. In step S250, the processor 13 displays the screen image updated in step S220 on the touch screen 11. For example, assuming that the screen image displayed on the touch screen 11 in step S250 is an inbox screen image, when the processor 13 detects a touch operation on the touch screen 11 in step S220, the processor 13 updates the messages in the inbox and displays the latest screen image of the inbox in step S250.

In some cases, the execution sequence of steps S210 and S220 can be adaptively adjusted. For example, assuming that no picture is originally displayed on the touch screen 11, after the processor 13 detects a touch operation on the touch screen 11, the processor 13 displays a picture having a first transparency on the touch screen 11 in response to the touch operation on the touch screen 11.

Figure 3A:
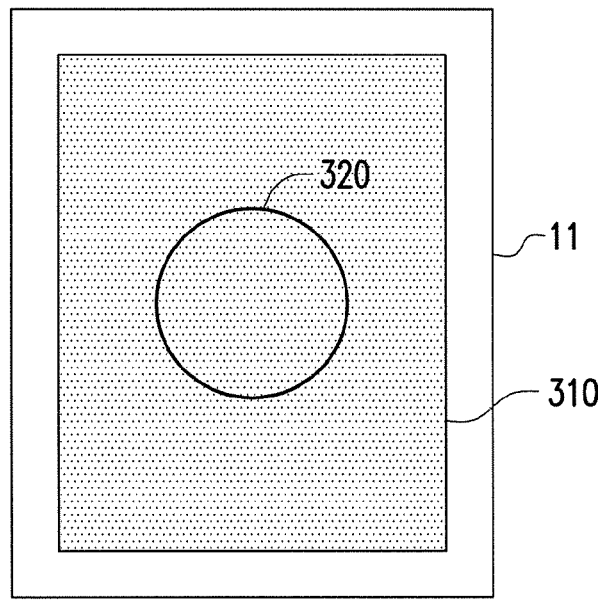
FIG. 3A and FIG. 3B are diagrams illustrating how a switch boundary is displayed to determine a second transparency according to an embodiment of the present invention.
Figure 3B:
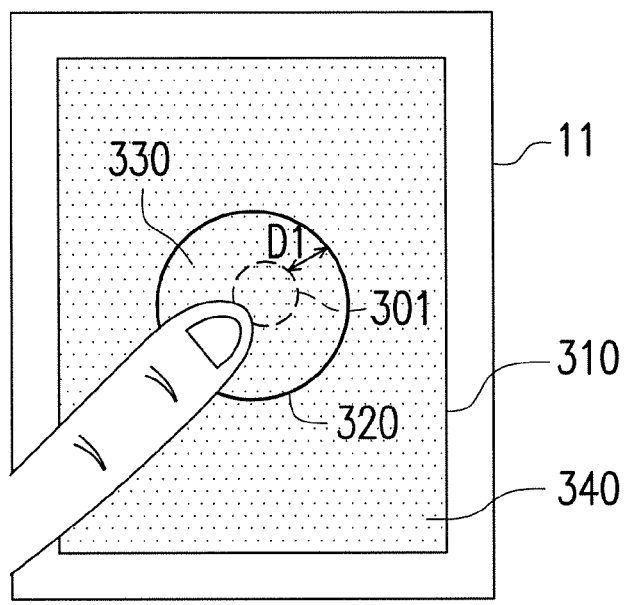

Additionally, in some examples of step S230, the processor 13 may also determine the second transparency of a picture according to the relative position or distance between the user's touch operation on the touch screen 11 and a determination standard. FIG. 3A and FIG. 3B are diagrams illustrating how a switch boundary is displayed to determine a second transparency according to an embodiment of the present invention. Referring to FIG. 3A, a picture 310 and a switch boundary 320 are displayed on the touch screen 11. Then, as shown in FIG. 3B, when a user performs a touch operation in a touch area 301 on the touch screen 11, the processor 13 calculates the minimum distance D1 between the position of the touch operation (i.e., the touch area 301) and the switch boundary 320. Next, the processor 13 determines the second transparency of the picture 310 according to the minimum distance D1. Herein the second transparency and the minimum distance D1 have a negative correlation. In other words, when the user's touch operation is closer to the switch boundary 320, the processor 13 increases the transparency of the picture 310, while when the user's touch operation is farther away from the switch boundary 320, the processor 13 reduces the transparency of the picture 310.

In some examples of step S230, after displaying a switch boundary on the touch screen 11, the processor 13 defines that the start position of a detected touch operation is corresponding to a first predetermined transparency (for example, the predetermined starting transparency) and defines that the switch boundary is corresponding to a second predetermined transparency. Herein the first predetermined transparency is higher than or equal to the first transparency, and the second predetermined transparency is higher than the first predetermined transparency. For example, the first predetermined transparency is 0% or 10%, and the second predetermined transparency is 90% or 100%, which should be determined according to the actual requirement. Thereafter, the processor 13 determines a value according to a linear distance between the end position of the touch operation and the start position thereof and a linear distance between the end position of the touch operation and the switch boundary. After that, the processor 13 performs an interpolation operation on the first predetermined transparency, the second predetermined transparency, and the value to obtain the second transparency.

Figure 3C:
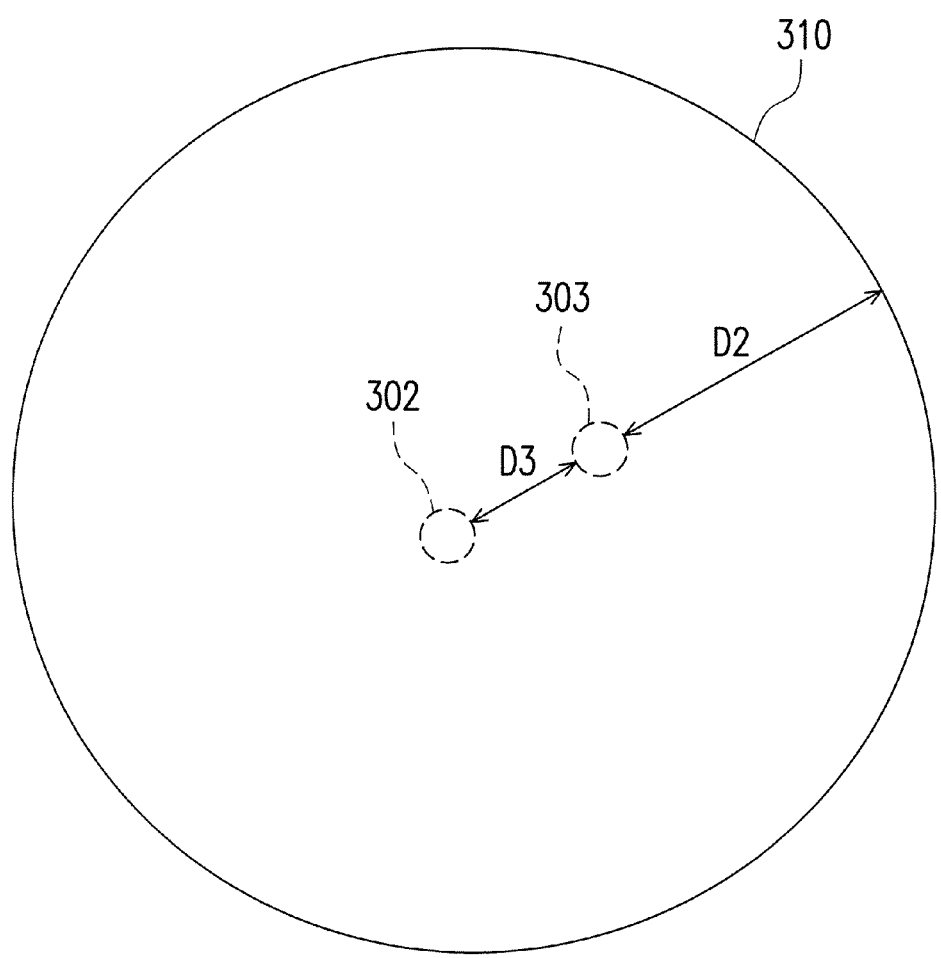
FIG. 3C is a diagram illustrating how a second transparency is determined through interpolation according to an embodiment of the present invention.

FIG. 3C is a diagram illustrating how a second transparency is determined through interpolation according to an embodiment of the present invention. Referring to FIG. 3C, it is assumed that the start position 302 is the start position of a touch operation, the end position 303 is the end position of the touch operation, and the switch boundary 310 is a switch boundary displayed in advance. The start position 302 is corresponding to a first predetermined transparency (for example, 10%), and the switch boundary 310 is corresponding to a second predetermined transparency (for example, 100%). The processor 13 obtains the linear distance D2 between the end position 303 and the switch boundary 310 and the linear distance D3 between the start position 302 and the switch boundary 310 and determines a value according to the linear distance D2 and the linear distance D3. Thereafter, the processor 13 performs an interpolation operation on the first predetermined transparency, the second predetermined transparency, and the value to obtain a second transparency. For example, assuming that D2=2 cm and D3=1 cm, the processor 13 obtains the value (i.e., 1/3) by calculating D3÷(D2+D3)=1/3. After that, the processor 13 obtains the second transparency ((100%−10%)*1/3+10%=40%) through the interpolation operation (for example, by deducting the product of the first predetermined transparency and the value from the second predetermined transparency and then adding the first predetermined transparency to the deduction result).

In addition, referring to FIG. 3B again, the processor 13 further divides the touch screen 11 into a start area 330 and a switch area 340 through the switch boundary 320. The second transparency is determined through interpolation only when the user's touch operation on the touch screen 11 is within the start area 330. If the user's touch operation on the touch screen 11 is within the switch area 340, the processor 13 sets the second transparency as a predetermined transparency (for example, a second predetermined transparency) corresponding to the switch area 340.

Second Embodiment

Figure 4:
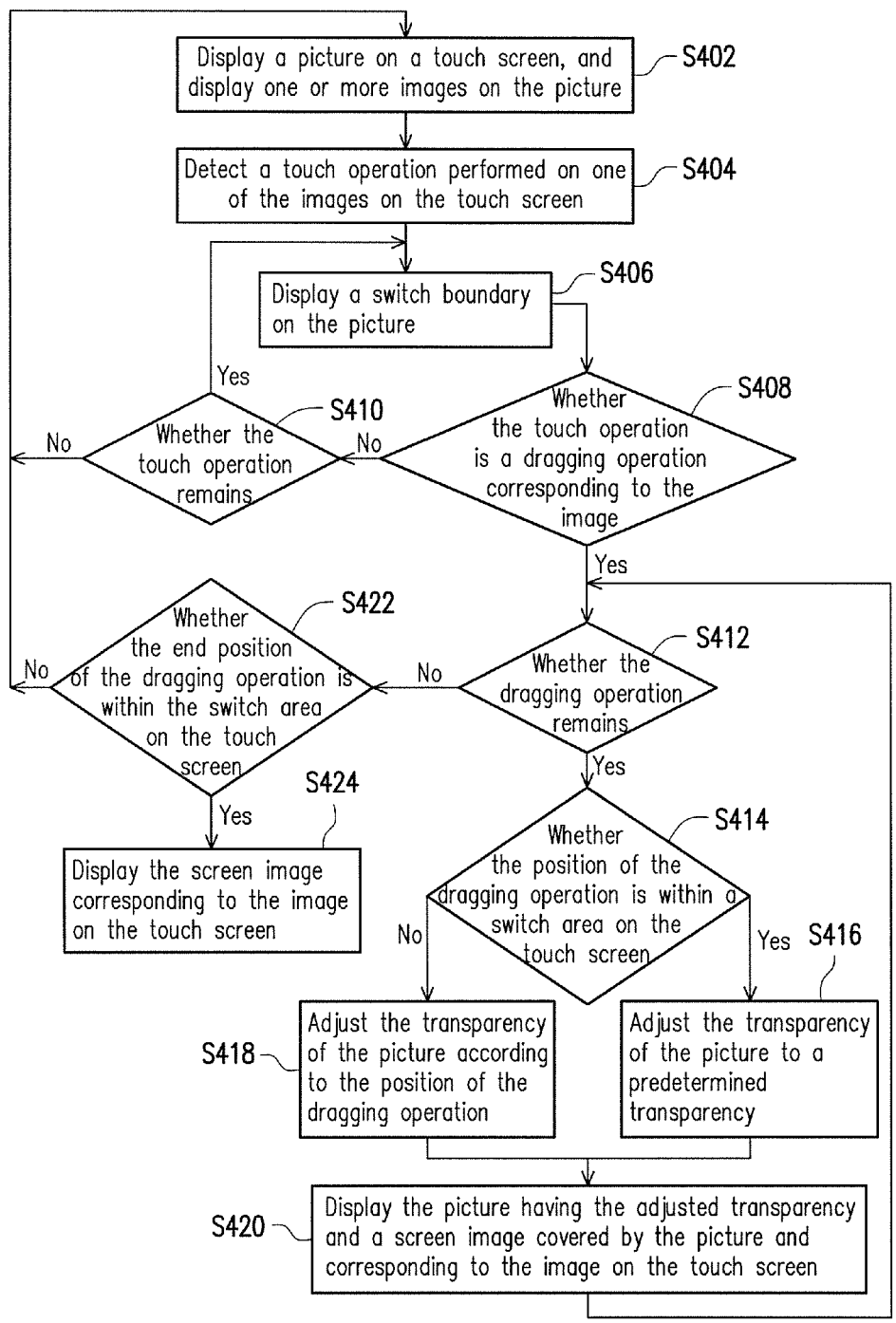
FIG. 4 is a flowchart of a display method according to a second embodiment of the present invention.

FIG. 4 is a flowchart of a display method according to the second embodiment of the present invention. It should be noted herein that the hardware structure in the second embodiment is similar to that in the first embodiment therefore will not be described again. Below, the second embodiment will be described with reference to components in the first embodiment.

Referring to FIG. 1 and FIG. 4, in step S402, the processor 13 displays a picture on the touch screen 11. In some cases, the picture is a picture predetermined by the electronic device 10 in the screen locking mode. The picture has a first transparency. In some cases, the first transparency is the minimum transparency (for example, 0%-10%) of the picture. However, the value of the first transparency can be adjusted according to the actual requirement. Besides, the size of the picture may be equal to the maximum display area of the touch screen 11. Or, the size of the picture may also be smaller than the maximum display area of the touch screen 11. However, the size of the picture is not limited in the present invention.

Then, the processor 13 displays one or more images on the picture. The image(s) may be generated by the processor 13 according to one or more notify events. For example, when the electronic device 10 receives a short message, an email, or an instant message from another electronic device, the processor 13 generates a corresponding notify event and generates a corresponding image according to the notify event, so as to notify the user to check the received short message, email, or instant message. Or, one of the images may be corresponding to a screen image of the electronic device 10 before the electronic device 10 enters the screen locking mode.

Additionally, when a predetermined reminding time of an event in the calendar or memo of the electronic device 10 is reached, the processor 13 displays an image corresponding to the event to notify the user to check the content of the event in the calendar or memo. Moreover, the image(s) may also be generated according to any other type of notify event, such as notification messages from a community website or conversation messages in an instant messaging application program. However, the invention is not limited thereto.

In some cases, each image is corresponding to an application program and is used for starting the corresponding application program. For example, the images are respectively corresponding to a SMS application program, an email application program, a notebook application program, a calendar or memo application program, and a video player application program. However, the present invention is not limited thereto. In an embodiment, the images are further used for starting a community website application programs and an instant messaging application program, etc.

Thereafter, in step S404, the processor 13 detects a touch operation performed on one of the images on the touch screen 11. For example, the processor 13 detects a clicking or dragging operation of the user on the touch screen 11 and stores information (for example, coordinate data) of the touch operation into the memory 12. Next, the processor 13 determines whether the touch operation is a touch operation corresponding to one of the images according to the coordinate data of the touch operation. After the processor 13 detects a touch operation performed on an image, in step S406, the processor 13 displays a switch boundary on the picture (the switch boundary surrounds the initial display position of the image) and defines the area on the touch screen 11 outside the switch boundary as a switch area.

Figure 5A:
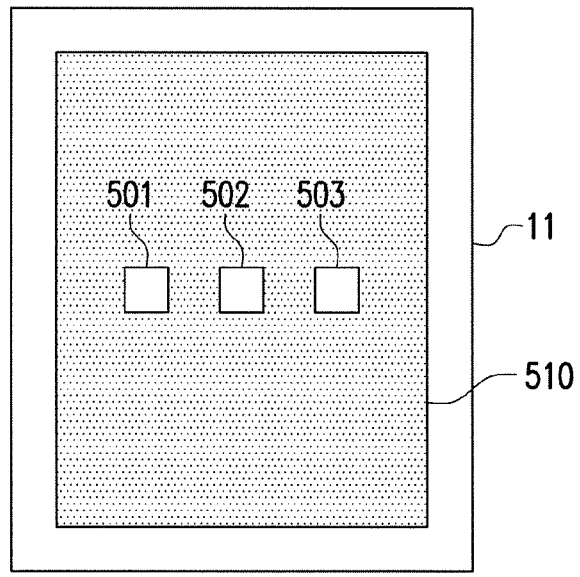
FIG. 5A and FIG. 5B are diagrams illustrating how a switch boundary is displayed on a picture according to the second embodiment of the present invention.
Figure 5B:
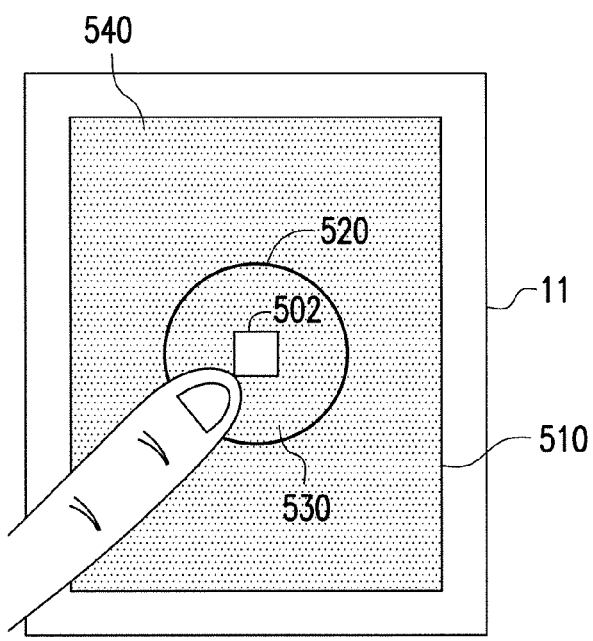

FIG. 5A and FIG. 5B are diagrams illustrating how a switch boundary is displayed on a picture according to the second embodiment of the present invention. Referring to FIG. 5A, a picture 510 is displayed on the touch screen 11, and the picture 510 has a predetermined transparency (i.e., the first transparency). In some cases, because the predetermined transparency of the picture 510 is the minimum transparency, the picture 510 completely covers the original screen image on the touch screen 11. However, the predetermined transparency can be adaptively adjusted. In addition, images 501-503 are displayed on the picture 510. For example, the image 501 is corresponding to a SMS application program, the image 502 is corresponding to an email application program, and the image 503 is corresponding to a community website application program.

Referring to FIG. 5B, when a user performs a touch operation corresponding to the image 502 (i.e., an image) on the touch screen 11 (for example, the user presses the image 502 on the touch screen 11), the touch screen 11 displays a switch boundary 520 centering around the initial display position of the image 502 on the picture 510 to divide or define the area on the touch screen 11 into a start area 530 and a switch area 540. Particularly, in some cases, the area in which the initial display position of the image 502 corresponding to a touch operation resides is defined as the start area 530, while the area outside the switch boundary 520 (or, the area in which the initial display position of an image other than the image 502 resides) is defined as the switch area 540. Moreover, in another embodiment, multiple switch boundaries are displayed on the touch screen 11 in advance and respectively surround the images 501-503.

It should be mentioned that even though in the present embodiment, the switch boundary 520 surrounds the initial display position of the image 502 as a circle, the present invention is not limited thereto, and the switch boundary 520 may further have a rectangular or oval shape. In addition, the switch boundary 520 may be visible or invisible (for example, virtual), which is not limited in the present invention either.

Next, in step S408, the processor 13 determines whether the touch operation is a dragging operation corresponding to the image. For example, the processor 13 determines whether a plurality of continuous coordinate information is detected after the touch operation is detected. If the processor 13 detects continuous coordinate information after detecting the touch operation, the processor 13 determines that the touch operation is a dragging operation corresponding to the image.

If the processor 13 determines that the touch operation is not a dragging operation corresponding to the image (for example, the processor 13 does not detect any continuous coordinate information after it detects the touch operation), in step S410, the processor 13 further determines whether the touch operation remains. If the touch operation remains (for example, the user keeps pressing the image at a fixed position on the touch screen 11), the processor 13 executes step S406 again to display the switch boundary (for example, the switch boundary 520 in FIG. 5B) on the touch screen 11. If the touch operation is ended or non-existent (for example, the user moves his or her input device away from the touch screen 11), the processor 13 executes step S402 again to restore the touch screen 11 back to that displayed in step S402.

On the other hand, if the processor 13 determines the touch operation to be a dragging operation corresponding to the image (for example, the processor 13 detects a plurality of continuous coordinate information after the processor 13 detects the touch operation), in step S412, the processor 13 determines whether the dragging operation remains. If the dragging operation remains, in step S414, the processor 13 further determines whether the current position of the dragging operation is within the switch area (for example, the switch area 540 in FIG. 5B) on the touch screen 11.

If the current position of the dragging operation is within the switch area (for example, the switch area 540 in FIG. 5B) on the touch screen 11, in step S416, the processor 13 adjusts the transparency of the picture into another predetermined transparency (i.e., a second transparency). In some cases, the second transparency is the maximum transparency of the picture. However, the value of the second transparency can be adjusted according to the actual requirement. Thereafter, in step S420, the processor 13 displays the picture with the adjusted transparency and the screen image which is covered by the picture and is corresponding to the image. In other words, the steps S416 and S420 in the present embodiment are similar to the steps S240 and S250 in the first embodiment. After step S420, the processor 13 executes step S412 again.

Figure 6:
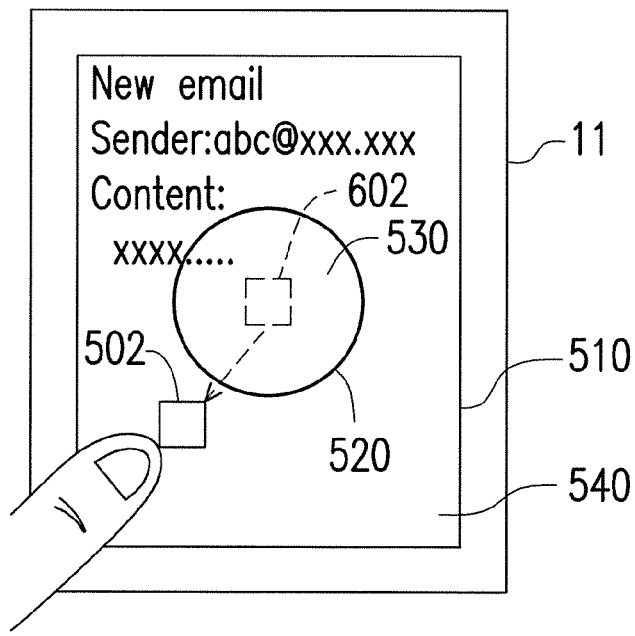
FIG. 6 is a diagram illustrating a dragging operation within a switch area according to the second embodiment of the present invention.

FIG. 6 is a diagram illustrating a dragging operation within a switch area according to the second embodiment of the present invention. Referring to FIG. 6, when the user drags the image 502 from the initial display position 602 in the start area 530 into the switch area 540 (or, onto the switch boundary 520), the processor adjusts the transparency of the picture 510 to the second transparency which is higher than the first transparency, so that the user can view the screen image which is covered by the picture 510 and is corresponding to the image 502 through the picture 510. In some cases, the image 502 is corresponding to an email application program, and accordingly, the screen image corresponding to the image 502 is an email screen image of received emails.

Figure 7:
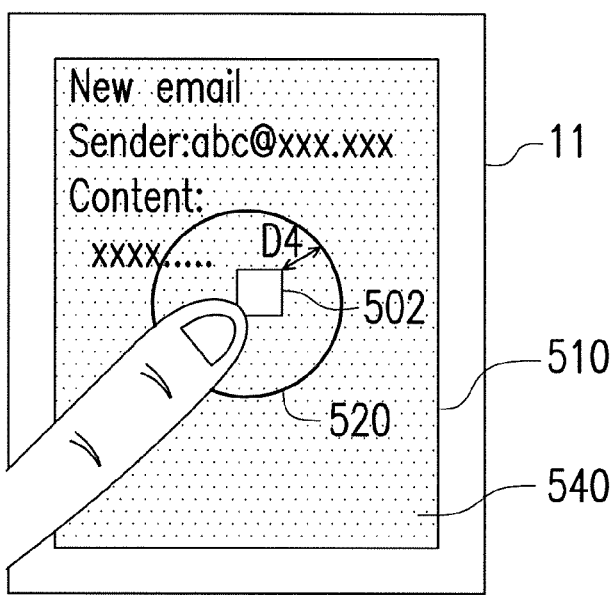
FIG. 7 is a diagram illustrating a dragging operation outside a switch area according to the second embodiment of the present invention.

On the other hand, if the current position of the dragging operation is not within the switch area on the touch screen 11 (for example, the current position of the dragging operation is within the start area 530 in FIG. 5B), in step S418, the processor 13 determines and adjusts the transparency of the picture according to the current position of the dragging operation. FIG. 7 is a diagram illustrating a dragging operation outside a switch area according to the second embodiment of the present invention. Referring to FIG. 7, after the user drags the image 502 from its initial display position to the position illustrated in FIG. 7, because the image 502 is not in the switch area 540, the processor obtains the minimum distance D4 between current position of the image 502 (i.e., the current position of the dragging operation) and the switch boundary 520. After that, the processor determines the second transparency of the picture through table lookup or interpolation. For example, a second transparency corresponding to each minimum distance is stored in the memory 12 in advance, and the processor obtains the second transparency corresponding to the minimum distance D4 from the memory 12.

In some cases, when the dragging operation is not within the switch area 540, the minimum distance D4 is in negative correlation with the adjusted transparency of the picture 510. In other words, the smaller the minimum distance D4 is, the greater the adjusted transparency of the picture 510 will be. Contrarily, the greater then minimum distance D4 is, the smaller the adjusted transparency of the picture 510 will be. When the minimum distance D4 is 0 (the dragging operation overlaps the switch boundary 520), similar to that in step S416, the transparency of the picture 510 is adjusted into a predetermined transparency (for example, the maximum transparency of the picture 510).

Moreover, because the screen image in FIG. 6 is covered by a picture having the second transparency (for example, the maximum transparency), while the screen image in FIG. 7 is covered by a picture having a transparency smaller than the second transparency, the screen image in FIG. 6 is clearer than the screen image in FIG. 7.

On the other hand, if the processor 13 determines in step S412 that the dragging operation is ended or non-existent (for example, the user moves the input device (for example, a finger) away from the touch screen 11), the processor 13 executes step S422. In step S422, the processor 13 determines whether the end position of the dragging operation is within the switch area (for example, the switch area 540 in FIG. 5B) on the touch screen 11.

If the end position of the dragging operation is within the switch area (for example, the switch area 540 in FIG. 5B) on the touch screen 11, in step S424, the processor 13 removes (or does not display) the picture and the switch boundary and displays the screen image corresponding to the image. For example, as shown in FIG. 6, when the user drags the image 502 into the switch area 540 and then moves the input device (for example, a finger) away from the touch screen 11, the dragging operation ends within the switch area 540 on the touch screen 11. In this case, the processor removes (or dose not display) the picture 510 and the switch boundary 520 and displays an email screen image corresponding to the image 502. In addition, if the processor 13 is originally in the screen locking mode, in step S424, the processor 13 switches the electronic device 10 from the screen locking mode to the unlocking mode or a normal operation mode.

On the other hand, if the end position of the dragging operation is not within the switch area on the touch screen 11 (for example, the dragging operation ends in the start area 530 illustrated in FIG. 5B), after step S424, the processor 13 executes step S402 again to restore the screen image of the touch screen 11 back to the screen image in step S402.

In other words, if the user wants to have a quick glance at the content of a notify event in the screen locking mode or a general operation mode of the electronic device 10, the user can do so by simply performing a dragging operation on the image corresponding to the notify event to adjust the transparency of the picture in the screen locking mode. When the user wants to edit or view the content of the notify event, the user can drag the image into a switch area on the touch screen and moves the input device away from the touch screen 11, so that the electronic device 10 is switched to the unlocking mode and/or the corresponding application program is switched, which allows the user to view the complete content of the notify event. Thereby, the convenience in using the electronic device 10 is greatly improved.

In some cases, the processor 13 can also automatically update the screen image corresponding to a selected image according to a predetermined rule. For example, after the processor 13 starts a SMS application program in response to a touch operation or a dragging operation corresponding to a SMS image, the processor 13 can automatically update the SMS screen image in the background at regular intervals or according to the latest notify event. If the electronic device 10 receives another short message when the processor 13 obtains a short message and displays a SMS screen image on a picture, the processor 13 can also display the SMS screen image corresponding to the newly received short message.

Or, one of the images may also be a screen restoration image. When the user drags the screen restoration image on the touch screen 11, the processor 13 changes the transparency of the picture correspondingly to display the screen image before the touch screen 11 enters the screen locking mode without unlocking the electronic device 10. After the user drags the screen restoration image into the switch area and then releases the screen restoration image, the processor 13 unlocks the electronic device 10. Additionally, one of the images may also be a typical quick launch button or a file shortcut, which is not limited in the present invention.

The scope of the present invention is not limited by the embodiments described above. In an embodiment, the switch boundary for marking the switch area and the start area may also be displayed at a predetermined position on the picture when the electronic device 10 enters the screen locking mode.

Third Embodiment

Figure 8:
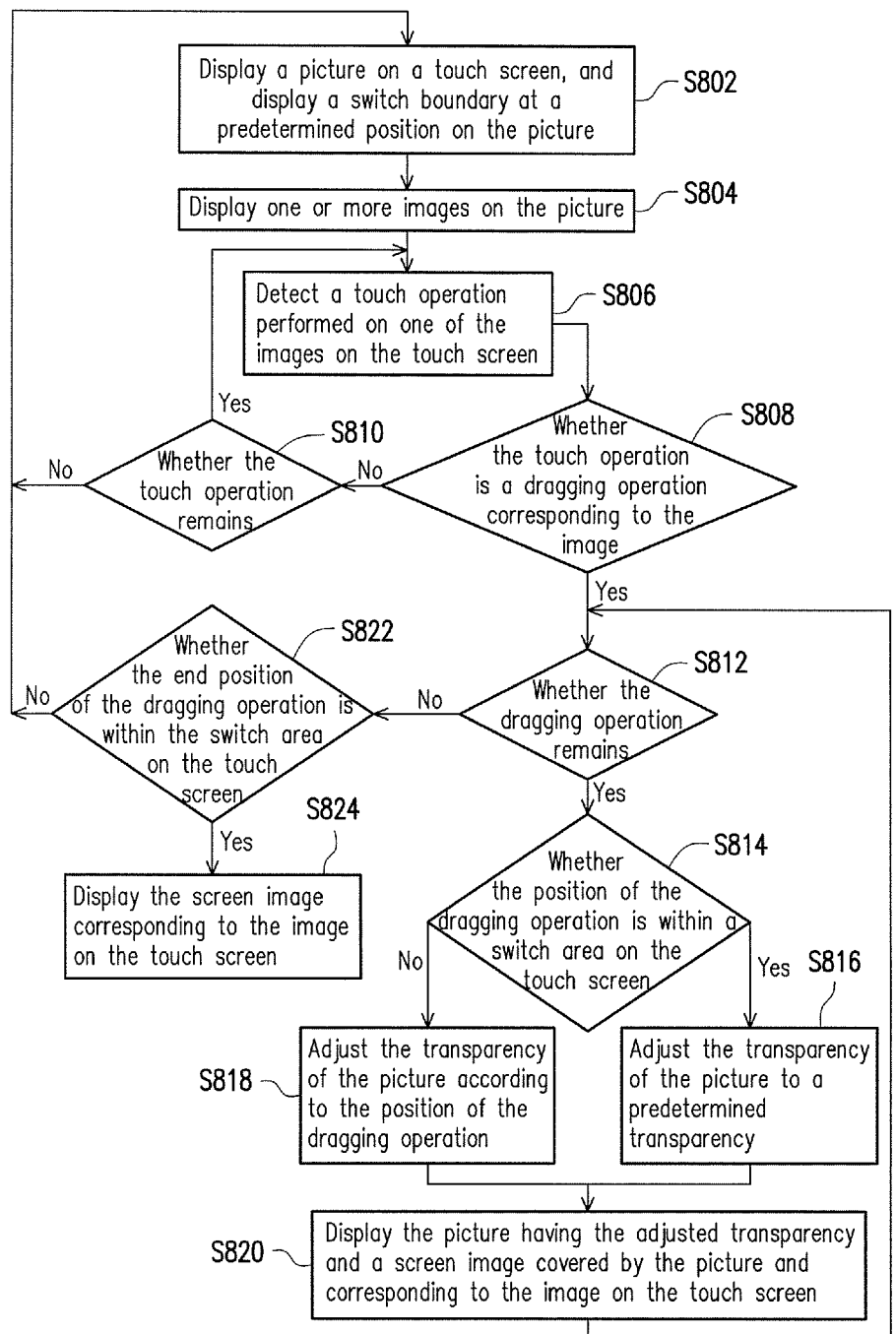
FIG. 8 is a flowchart of a display method according to a third embodiment of the present invention.

FIG. 8 is a flowchart of a display method according to the third embodiment of the present invention. Please note that the hardware structure in the third embodiment is similar to that in the first embodiment therefore will not be described herein. Below, the third embodiment will be described with reference to the components in the first embodiment.

Referring to FIG. 1 and FIG. 8, in step S802, the processor 13 displays a picture having a predetermined transparency (i.e., a first transparency) on the touch screen 11. In some cases, the first transparency is the minimum transparency (for example, 0%-10%) of the picture. However, the first transparency can be adjusted according to the actual requirement. Then, the processor 13 displays a switch boundary at a predetermined position on the picture to define the area on the touch screen 11 surrounded by the switch boundary as a switch area. In the present embodiment, the picture is a picture predetermined in the screen locking mode of the electronic device 10, and the switch boundary is an unlocking image predetermined in the screen locking mode of the electronic device 10.

In next step S804, the processor 13 displays one or more images on the picture. The number of the images and the application program, screen image, and initial display position corresponding to each image can be determined according to the actual requirement. For example, the processor 13 displays the one or more images according to one or more notify events. Particularly, in some cases, the switch area defined in step S802 does not cover the initial display position of any image.

Figure 9:
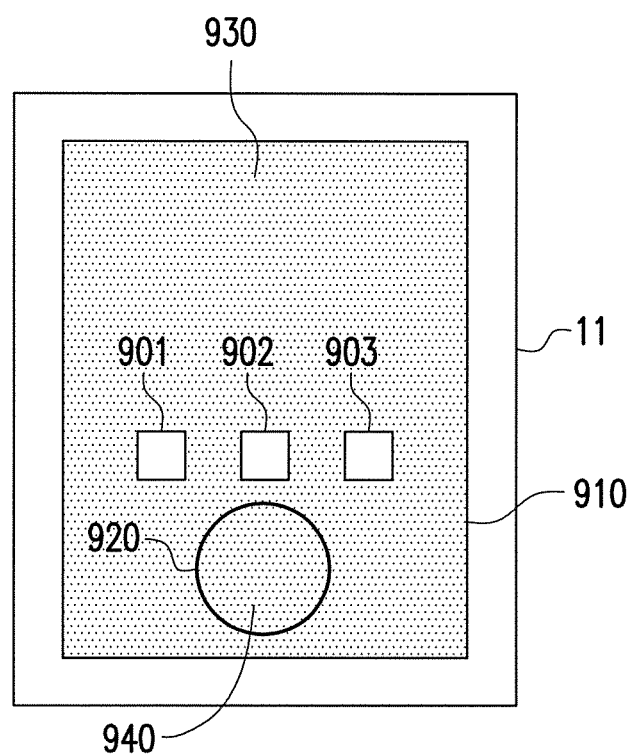
FIG. 9 is a diagram illustrating how a switch boundary and an image are displayed on a picture according to the third embodiment of the present invention.

FIG. 9 is a diagram illustrating how a switch boundary and an image are displayed on a picture according to the third embodiment of the present invention. Referring to FIG. 9, a picture 910 is displayed on the touch screen 11, and a switch boundary 920 is displayed at a predetermined position on the picture 910. The switch boundary 920 divides or defines the area on the touch screen 11 into a start area 930 and a switch area 940. Even though the switch boundary 920 in the present embodiment has a circular shape, the shape of the switch boundary 920 is not limited in the present invention and may also be a rectangular or oval shape. Besides, the switch boundary 920 may be visible or invisible (for example, virtual), which is not limited in the present invention. Moreover, images 901-903 are displayed on the picture 910 and located within the start area 930, and the images 901-903 are respectively corresponding to a screen image and/or an application program.

Next, in step S806, the processor 13 detects a touch operation performed on one of the images on the touch screen 11. After the processor 13 detects the touch operation on the image (for example, a touch operation performed by the user on the image 903), in step S808, the processor 13 determines whether the touch operation is a dragging operation corresponding to the image (for example, a dragging operation performed by the user on the image 903). If the processor 13 determines that the touch operation is not a dragging operation corresponding to the image, in step S810, the processor 13 determines whether the touch operation remains. If the touch operation remains, the processor 13 executes step S808 again. If the touch operation is ended or non-existent, the processor 13 executes step S802 again to restore the screen image on the touch screen 11 back to that displayed in step S802.

On the other hand, if the processor 13 determines that the touch operation is a dragging operation corresponding to the image, in step S812, the processor 13 determines whether the dragging operation remains. If the dragging operation remains (for example, the user keeps dragging the image on the touch screen 11), in step S814, the processor 13 determines whether the current position of the dragging operation is within the switch area (for example, the switch area 940 in FIG. 9) on the touch screen 11.

If the current position of the dragging operation is within the switch area (for example, the switch area 940 in FIG. 9) on the touch screen 11, in step S816, the processor 13 adjusts the transparency of the picture (for example, the picture 910 in FIG. 9) into another predetermined transparency (i.e., the second transparency). In some cases, the second transparency is the maximum transparency of the picture. However, the value of the second transparency can be adjusted according to the actual requirement.

Figure 10:
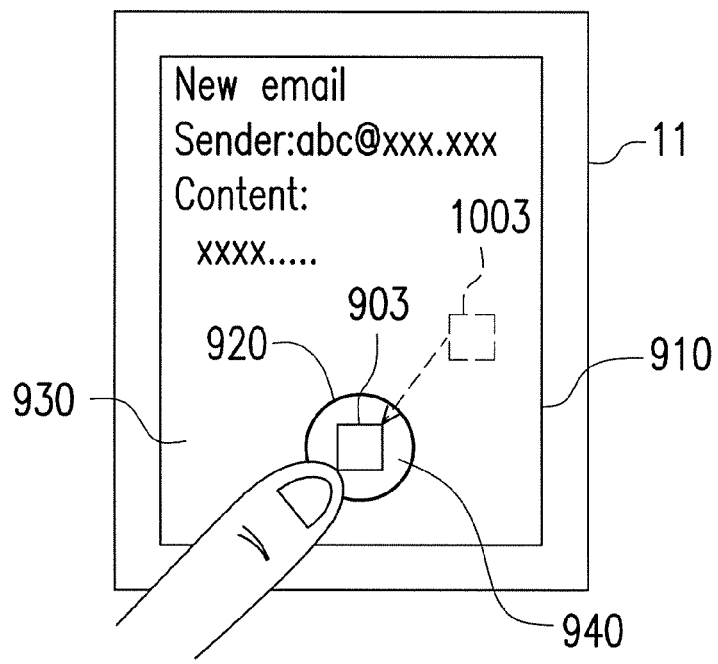
FIG. 10 is a diagram illustrating a dragging operation within a switch area according to the third embodiment of the present invention.

FIG. 10 is a diagram illustrating a dragging operation within a switch area according to the third embodiment of the present invention. Referring to FIG. 10, when the user drags the image 903 from the initial display position 1003 of the image 903 in the start area 930 into the switch area 940 (or onto the switch boundary 920), the processor adjusts the transparency of the picture 910 to a second transparency higher than the first transparency, so that the user can view the screen image which is covered by the picture 910 and corresponding to the image 903 through the picture 910. Similar to that in the second embodiment, it is assumed that the image 903 is corresponding to an email application program, and the screen image corresponding to the image 903 is an email screen image of received emails.

On the other hand, if the current position of the dragging operation is not within the switch area on the touch screen 11 (for example, the dragging operation is within the start area 930 in FIG. 9), in step S818, the processor 13 determines and adjusts the transparency of the picture according to the current position of the dragging operation. For example, the processor 13 obtains the minimum distance between the current position of the dragging operation and the switch boundary (for example, the switch boundary 920 in FIG. 9) and determines and adjusts the transparency of the picture according to the minimum distance.

Figure 11:
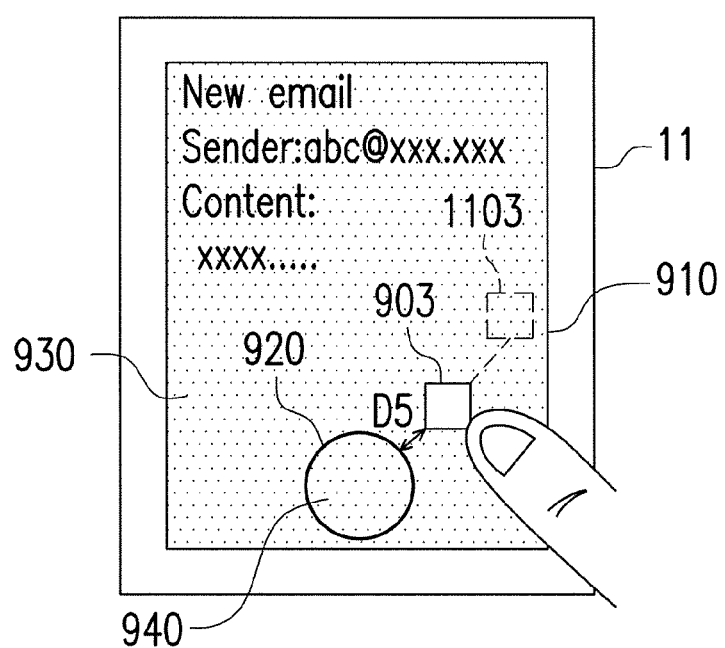
FIG. 11 is a diagram illustrating a dragging operation outside a switch area according to the third embodiment of the present invention.

FIG. 11 is a diagram illustrating a dragging operation outside a switch area according to the third embodiment of the present invention. Referring to FIG. 11, after the user drags the image 903 from its initial display position 1103 to a position in the start area 930 illustrated in the FIG. 11, because the image 903 is not dragged into the switch area 940, the processor 13 can obtain the minimum distance D5 between the current position of the image 903 (i.e., the current position of the dragging operation) and the switch boundary 920. Thereafter, the processor 13 determines the adjusted transparency of the picture 910 through table lookup or interpolation, so as to display the picture 910 with the adjusted transparency and the screen image which is covered by the picture 910 and is corresponding to the image 903.

Particularly, in some cases, when the dragging operation is not within the switch area 940 (i.e., within the original area 830), the minimum distance D5 and the adjusted transparency of the picture 910 have a negative correlation. For example, the smaller the minimum distance D5 is, the greater the adjusted transparency of the picture 910 will be, while the greater the minimum distance D5 is, the smaller the adjusted transparency of the picture 910 will be. When the minimum distance D5 is 0 (i.e., the dragging operation overlaps the switch boundary 920), similar to that in step S816, the transparency of the picture 910 is adjusted to the second transparency (for example, the maximum transparency of the picture 910).

After determining and adjusting the transparency of the picture, in step S820, the processor 13 displays a screen image which is covered by the picture and is corresponding to the image based on the adjusted transparency of the picture (for example, the email screen image covered by the picture 910 illustrated in FIG. 10). After step S820, the processor 13 executes step S812 again.

On the other hand, if the processor 13 determines in step S812 that the dragging operation is already ended or non-existent (for example, the user moves the input device away from the touch screen 11), the processor 13 executes step S822. In step S822, the processor 13 determines whether the end position of the dragging operation is within the switch area on the touch screen 11. If the end position of the dragging operation is within the switch area on the touch screen 11, in step S824, the processor 13 displays a screen image corresponding to the image. For example, as shown in FIG. 10, after the user drags the image 903 into the switch area 940 and moves the input device away from the touch screen 11, the processor 13 removes (or does not display) the picture 910 and the switch boundary 920 and displays a screen image corresponding to the image 903 (for example, an email screen image).

Additionally, in step S824, the processor 13 also switches the electronic device 10 from the screen locking mode to the unlocking mode. Moreover, if the end position of the dragging operation is not within the switch area on the touch screen 11, after step S822, the processor 13 executes step S802 again. Taking FIG. 11 as an example, after the user drags the image 903 to the position in the start area 930 illustrated in FIG. 11 and moves the input device away from the touch screen 11, the processor 13 restores the screen image of the touch screen 11 back to the screen image in step S802.

An embodiment of the present invention also provides a non-transitory storage medium. The non-transitory storage medium records at least one program instruction or program code. After being loaded into an electronic device with a touch screen, the at least one program instruction or program code is executed to carry out the display method provided by each embodiment described above.

For example, after the at least one program instruction or program code in the computer-readable recording medium is loaded into the electronic device 10 illustrated in FIG. 1, the processor 13 runs the at least one program instruction or program code to execute the display method provided by one of the first to fourth embodiments described above. Or, the computer-readable recording medium may also be replaced by the memory 12 in FIG. 1. The computer-readable recording medium may be a read-only memory (ROM), a random-access memory (RAM), a CD-ROM, a tape, a floppy disk, or an optical data storage device.

As described above, the present invention provides a display method, an electronic device, and a non-transitory storage medium, in which a user is allowed to preview a screen image corresponding to an image through a picture without switching the screen image to a screen image corresponding to the image. After the user views the screen image through the picture, if the user decides to view other parts of the screen image or further perform any other operation, the user can drag the image into a switch area on the touch screen and moves the input device (for example, the user's finger) away from the touch screen, so that the screen image displayed on the touch screen is switched to the screen image corresponding to the image. Thereby, the convenience of viewing different messages when the user uses the electronic device is greatly improved.

Moreover the display method is adapted to both a screen locking mode and an unlocking mode (i.e., the normal operation mode) of the electronic device therefore is very flexible in its implementation. By displaying a picture having an adjustable transparency on the screen image corresponding to an image, the privacy is protected when messages are quickly browsed in a public place.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display method for an electronic device, wherein the electronic device has a touch screen, the display method comprising:
   displaying a picture having a first transparency on the touch screen;
   detecting a touch operation on the touch screen;
   determining a second transparency of the picture according to a position of the touch operation, wherein the second transparency is higher than the first transparency; and
   simultaneously displaying the picture having the second transparency and a screen image covered by the picture on the touch screen.

2. The display method according to claim 1, wherein the second transparency and a displacement of the touch operation have a positive correlation.

3. The display method according to claim 1, wherein the step of determining the second transparency of the picture according to the position of the touch operation further comprises:
   calculating the second transparency of the picture according to a displacement of the touch operation.

4. The display method according to claim 1, wherein the step of determining the second transparency of the picture according to the position of the touch operation further comprises:
   when a displacement of the touch operation is in a predetermined range, setting the second transparency as a predetermined transparency corresponding to the predetermined range.

5. The display method according to claim 1, wherein the step of determining the second transparency of the picture according to the position of the touch operation further comprises:

when the position of the touch operation is in a predetermined area of the touch screen, setting the second transparency as a predetermined transparency corresponding to the predetermined area.

6. The display method according to claim 1 further comprising:
displaying a switch boundary on the touch screen, wherein the step of determining the second transparency of the picture according to the position of the touch operation further comprises:
calculating a minimum distance between the position of the touch operation and the switch boundary; and
determining the second transparency according to the minimum distance, wherein the second transparency and the minimum distance have a negative correlation.

7. The display method according to claim 1 further comprising:
displaying a switch boundary on the touch screen, wherein the step of determining the second transparency of the picture according to the position of the touch operation further comprises:
defining that a start position of the touch operation is corresponding to a first predetermined transparency;
defining that the switch boundary is corresponding to a second predetermined transparency, wherein the second predetermined transparency is higher than the first predetermined transparency;
determining a value according to a linear distance between an end position of the touch operation and the start position and a linear distance between the end position of the touch operation and the switch boundary; and
performing an interpolation operation on the first predetermined transparency, the second predetermined transparency, and the value to obtain the second transparency.

8. The display method according to claim 1 further comprising:
displaying a switch boundary on the touch screen, wherein the touch screen is divided by the switch boundary into a start area and a switch area, wherein the step of determining the second transparency of the picture according to the position of the touch operation further comprises:
when the position of the touch operation is in the start area, defining that a start position of the touch operation is corresponding to a first predetermined transparency and the switch boundary is corresponding to a second predetermined transparency, wherein the second predetermined transparency is higher than the first predetermined transparency, determining a value according to a linear distance between an end position of the touch operation and the start position and a linear distance between the end position of the touch operation and the switch boundary, and performing an interpolation operation on the first predetermined transparency, the second predetermined transparency, and the value to obtain the second transparency; and
when the position of the touch operation is in the switch area, setting the second transparency as a predetermined transparency corresponding to the switch area.

9. The display method according to claim 1 further comprising:
updating the screen image in response to the touch operation detected on the touch screen.

10. The display method according to claim 1, wherein a covering range of the picture is equal to an actual maximum display area of the touch screen.

11. The display method according to claim 1 further comprising:
displaying at least one image on the touch screen, wherein the touch operation is a touch operation corresponding to one of the at least one image, and the screen image is corresponding to the image.

12. The display method according to claim 11 further comprising:
displaying a switch boundary on the touch screen, wherein the touch screen is divided by the switch boundary into a start area and a switch area, and the image is displayed in the start area on the touch screen;
when the touch operation ends, determining whether an end position of the touch operation is in the switch area on the touch screen; and
when the end position of the touch operation is in the switch area, not displaying the picture on the touch screen.

13. The display method according to claim 12 further comprising:
when the end position of the touch operation is in the switch area, switching the electronic device from a screen locking mode to an unlocking mode.

14. The display method according to claim 12, wherein the step of displaying the switch boundary on the touch screen further comprises:
displaying the switch boundary on the touch screen in response to the touch operation detected on the touch screen.

15. The display method according to claim 14, wherein the switch boundary surrounds an initial display position of the image.

16. The display method according to claim 11, wherein the step of displaying the at least one image on the touch screen comprises:
displaying the at least one image according to at least one notify event.

17. The display method according to claim 1, wherein the screen image is one of a key frame, a short message service (SMS) screen image, an email screen image, a notebook screen image, a calendar or memo screen image, and a graphic screen image.

18. The display method according to claim 1, wherein the step of displaying the picture having the first transparency on the touch screen further comprises:
displaying the picture having the first transparency on the touch screen in response to the touch operation detected on the touch screen.

19. An electronic device, comprising:
a touch screen;
a memory;
at least one processor; and
at least one program, stored in the memory and configured to be executed by the at least one processor, wherein the at least one program comprises instructions for executing following operations:
displaying a picture having a first transparency on the touch screen;
detecting a touch operation on the touch screen;
determining a second transparency of the picture according to a position of the touch operation, wherein the second transparency is higher than the first transparency; and simultaneously displaying the picture having the second transparency and a screen image covered by the picture on the touch screen.

20. A non-transitory storage medium storing at least one program instruction, and after the at least one program instruction is located into an electronic device having a touch screen, the at least one program instruction executes following steps:

displaying a picture having a first transparency on the touch screen;

detecting a touch operation on the touch screen;

determining a second transparency of the picture according to a position of the touch operation, wherein the second transparency is higher than the first transparency; and simultaneously displaying the picture having the second transparency and a screen image covered by the picture on the touch screen.

* * * * *